(12) United States Patent
Wackerly et al.

(10) Patent No.: US 11,757,729 B2
(45) Date of Patent: Sep. 12, 2023

(54) METHOD AND SYSTEM FOR FACILITATING AUTO-ANNOTATION AND DYNAMIC DISPLAY FOR SWITCH CONFIGURATIONS

(71) Applicant: Hewlett Packard Enterprise Development LP, Houston, TX (US)

(72) Inventors: Shaun Wackerly, Lincoln, CA (US); Frank Wood, Elk Grove, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/244,056

(22) Filed: Apr. 29, 2021

(65) Prior Publication Data
US 2022/0353156 A1    Nov. 3, 2022

(51) Int. Cl.
*H04L 41/22* (2022.01)
*H04L 41/08* (2022.01)
*H04L 41/082* (2022.01)

(52) U.S. Cl.
CPC ............ *H04L 41/22* (2013.01); *H04L 41/082* (2013.01); *H04L 41/0879* (2013.01)

(58) Field of Classification Search
CPC .... H04L 41/22; H04L 41/082; H04L 41/0879
See application file for complete search history.

(56) References Cited

U.S. PATENT DOCUMENTS

2020/0175103 A1*  6/2020  Atwal ................... H04L 41/084

OTHER PUBLICATIONS

Reijers, Hajo A., et al. "Syntax highlighting in business process models." Decision Support Systems 51.3: 339-349. (Year: 2011).*
He, Gang, Yang Wang, and Xiaochun Wu. "A regular expression grouping algorithm based on partitioning method." 2012 3rd IEEE International Conference on Network Infrastructure and Digital Content. IEEE. (Year: 2012).*
Kim, Hyojoon, et al. "The evolution of network configuration: A tale of two campuses." Proceedings of the 2011 ACM SIGCOMM conference on Internet measurement conference. (Year: 2011).*
Lutterkort, David. "Augeas—a configuration API." Linux Symposium, Ottawa, ON. (Year: 2008).*
Chen, Xu, Z. Morley Mao, and Jacobus Van der Merwe. "Towards automated network management: network operations using dynamic views." Proceedings of the 2007 SIGCOMM workshop on Internet network management.. (Year: 2007).*
Mark Santolucito, Ennan Zhai, Rahul Dhodapkar, Aaron Shim, and Ruzica Piskac. 2017. Synthesizing configuration file specifications with association rule learning. Proc. ACM Program. Lang. 1, OOPSLA, Article 64. (Year: 2017).*

* cited by examiner

*Primary Examiner* — John M Macilwinen
(74) *Attorney, Agent, or Firm* — Park, Vaughan, Fleming & Dowler LLP

(57) ABSTRACT

A system for dynamically managing a configuration file of a switch is provided. During operation, the system can determine one or more groups of line specifications in a specification file. A respective line specification can indicate a format of a respective variant of a configuration command of the switch. The system can then annotate a respective group in the specification file with a corresponding label. Subsequently, the system can associate a respective configuration command of the configuration file with a label of a group based on matching the configuration command with the group.

18 Claims, 16 Drawing Sheets

METHOD AND SYSTEM FOR FACILITATING AUTO-ANNOTATION AND DYNAMIC DISPLAY FOR SWITCH CONFIGURATIONS

BACKGROUND

Field

The present disclosure relates to communication networks. More specifically, the present disclosure relates to a method and system for facilitating automated annotation and dynamic display of the switch configurations.

BRIEF DESCRIPTION OF THE FIGURES

In the figures, like reference numerals refer to the same figure elements.

DETAILED DESCRIPTION

Figure 1:
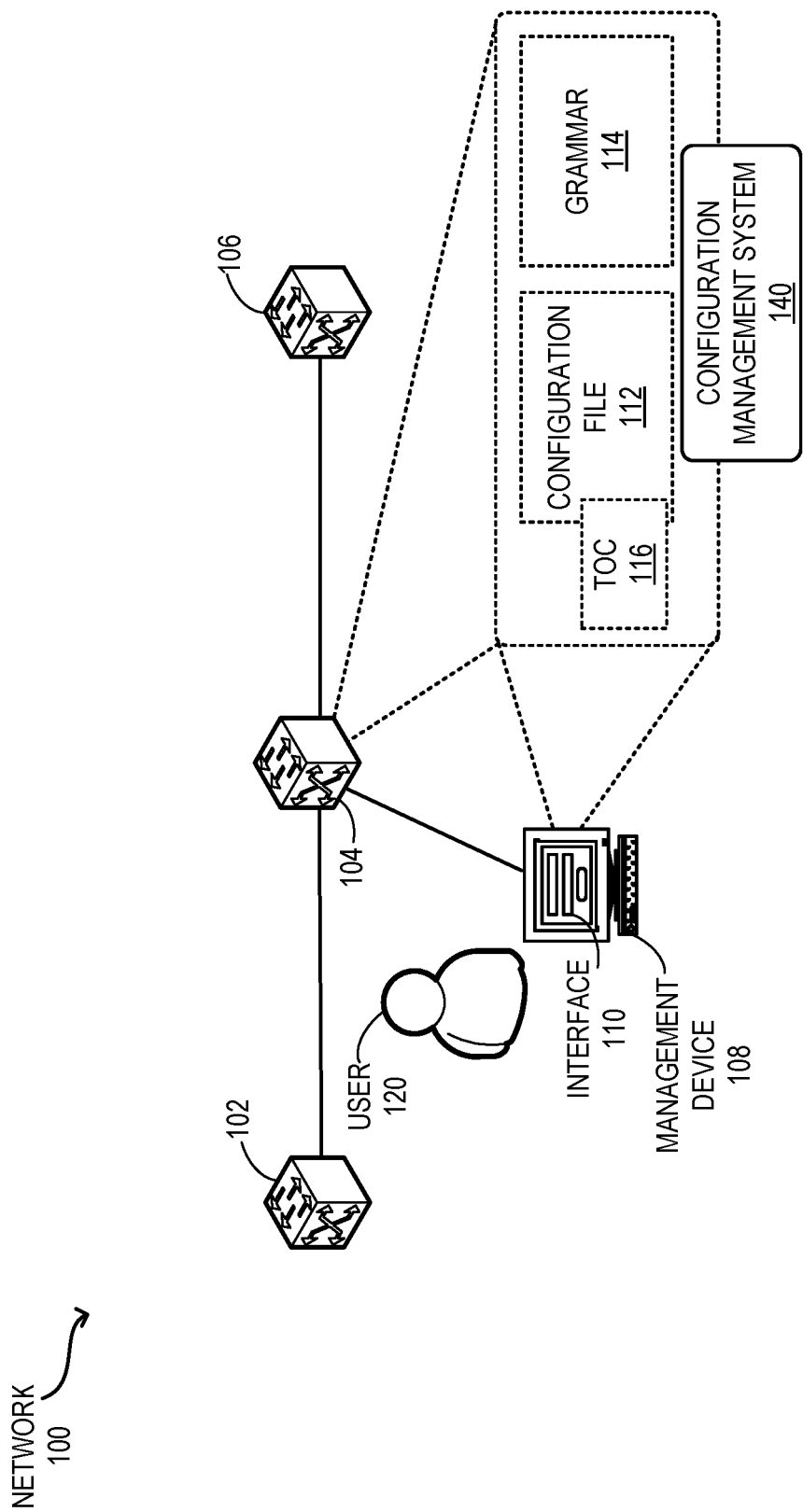
FIG. 1 illustrates an exemplary network facilitating auto-annotation and dynamic display for switch configurations, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Internet is the delivery medium for a variety of applications running on physical and virtual devices. Such applications have brought with them an increasing traffic demand. As a result, equipment vendors race to build switches with versatile capabilities. To do so, a switch may operate different protocols and services. A network administrator may need to configure the protocols and services, each of which may require a large number of configuration commands. Typically, a switch configuration file can be used to store the configuration commands. The lines in the configuration file can correspond to the configuration commands (e.g., the configuration commands in a textual form). When a switch is booted, the switch may parse the configuration file and configure the protocols and service based on the lines of the configuration file. In this way, the switch can facilitate the control and data plane based on the configuration file.

Since a configuration file may include a large number of configuration commands, the switch configuration file may become large. For example, it is not uncommon for a configuration file to include thousands of lines of configuration commands. To review or modify the configuration of a switch, the administrator may prefer to view the content of the configuration file. The administrator may use an interface (e.g., a graphical user interface (GUI)) that can display the configuration file. However, the configuration commands in the configuration file may not be organized. As a result, navigating through a large number of lines of text can be cumbersome. Even if the configuration commands are organized, the administrator may need to know the particular phrases of the command for searching the configuration file. While a GUI can bring many desirable features to displaying the configuration file, some issues remain unsolved regarding locating the relevant commands in the configuration file of the switch.

One embodiment of the present technology provides a system for dynamically managing a configuration file of a switch. During operation, the system can determine one or more groups of line specifications in a specification file. A respective line specification can indicate a format of a respective variant of a configuration command of the switch.

The system can then annotate a respective group in the specification file with a corresponding label. Subsequently, the system can associate a respective configuration command of the configuration file with a label of a group based on matching the configuration command with the group.

In a variation on this embodiment, the system can match the configuration command with the group by matching the configuration command with a regular expression of the group.

In a further variation, the system can generate the regular expression based on a keyword and a unique identifier of a line specification of the group. The system can then incorporate the regular expression in the specification file.

In a variation on this embodiment, the system can match the configuration command with the group by matching the configuration command with a format indicated by the group. The system can then annotate the configuration command with the label in the configuration file.

In a further variation, the system can identify a plurality of configuration commands with the group and annotate the plurality of configuration commands with the label.

In a variation on this embodiment, the system can associate the configuration command with an entry of a table of content for the configuration file. Here, the entry can correspond to the group.

In a further variation, the system can selectively display, in a graphical user interface (GUI), one or more configuration commands associated with the label in the configuration file in response to an input to the entry of the table of content.

In a further variation, the system can identify a sub-command of the configuration command. The system can also annotate the sub-command with a sub-label within a context of the label. The system can then generate a sub-entry under the entry of the table of content.

In a variation on this embodiment, the system can group a plurality of non-contiguous configuration commands associated with the label in adjacent lines of the configuration file.

In a variation on this embodiment, the system can annotate a first configuration command declaring a configuration object with a first label. The system can also annotate a second configuration command referencing the configuration object with a second label. The system can then link the first label to the second label.

In a variation on this embodiment, the system can determine the one or more groups by determining a level of a match for one or more terms in a line specification with one or more other line specifications. If the level of match is greater than a threshold, the system can group the line specification with the one or more other line specifications.

The embodiments described herein solve the problem of efficiently navigating different sections of a switch configuration file by (i) annotating the configuration file with labels based on the switch grammar; and (ii) dynamically generating table of content (ToC) entries based on the labels. The switch grammar can indicate the format of a respective line of the configuration file (e.g., a configuration command). A configuration management system can allow an administrator to navigate different sections of the configuration file using the ToC.

The configuration file can include several thousand lines directed to different services and protocols deployed by a switch. Therefore, navigating the configuration file can be challenging. With existing technologies, an administrator may use a text editor to view the configuration file. The editor can be equipped with a scrollbar that can be used to scroll up or down to view different portions of the configuration file. The scrollbar can be annotated with pop-up help that can indicate the page number, section header, or a small thumbnail view of the content of the current view. The editor may also allow an administrator to search for specific text in the configuration file. By accessing the matched instances (e.g., by providing input on them), the corresponding text can be located within the configuration file. Furthermore, if the configuration file is annotated with markup indicating the headings and sub-headings, the editor may incorporate the annotations into a table of contents. However, some of these techniques may require manual intervention. Moreover, even with these techniques, navigating through the configuration file may remain cumbersome.

To solve this problem, the editor can be enhanced with a configuration management system (CMS). The system can pre-process the text of the configuration file before presenting the text to the administrator. The processing can include matching a respective line of the configuration file to a grammar definition in the switch grammar and creating a merged and overlay view for all documents in the session. The grammar of a switch can be stored in a grammar file and indicate the format of a respective configuration command supported by the switch. The grammar can include a set of line specifications, each of which can indicate a format for all variants, including unique identifiers (or terms) and keywords, of a configuration command. A line specification can be referred to as a linespec. Since the grammar file stores line specifications, the grammar file can also be referred to as a specification file.

In some embodiments, the system can parse the grammar and determine similar linespecs, which may appear adjacent to each other within the grammar. The system can then allocate a common label to the grouped linespecs. The grouped linespecs can be referred to as a linespec group. The system can group a plurality of linespecs if the number of terms and keywords that the corresponding commands have in common exceeds a threshold. The system may maintain an exclusion list to prevent known similar-looking commands from being grouped. For example, there can be multiple commands corresponding to a server setup (e.g., related to port, description, location, and contact associated with the setup).

If the number of terms and keywords associated with the commands for the server setup exceeds a threshold, the system can group the corresponding linespecs into a single "server setup" linespec group. The system can then allocate a single label to the linespec group. The system may also include other group characteristics, such as a group priority (e.g., for priority-based ordering relative to other groups) and a regular expression representing the linespec group, in the grammar. Based on the grouping, a linespec group in the grammar may include a single linespec marked with a label. Hence, a label can correspond to one or more linespecs in the grammar. Upon incorporating the labels into the grammar, the system can parse the configuration file of a switch.

To present a pre-processed configuration file to the user, the system can match a respective line of the configuration file to a linespec of the grammar. Upon the completion of the matching, the editor can display the resulting configuration file as a rich and editable document to the administrator. In response to a respective edit to the configuration file, the system can repeat the pre-processing operations. To further enhance the pre-processing operations, the system can dynamically generate labels (or tags) corresponding to the labels of the matched linespec and annotate the configuration file with the labels. If multiple configuration lines (i.e., the configuration commands) in the configuration file match the same linespec, the system can associate the configuration lines to the same label.

For example, multiple configuration lines associated with different virtual local area networks (VLANs) can match the same linespec associated with the configuration of a VLAN. Based on the matching, the system can obtain a label corresponding to VLAN from the grammar and annotate the configuration lines with the label. If the command lines with the label are sparsely defined in the configuration file, the system can update the configuration file such that the configuration lines are combined or made adjacent. In this way, the system can sort the configuration file based on an order of the matching with the linespecs of the grammar. Consequently, by labeling the first instance of a linespec match, the system can insert a label in the configuration file where the subsequent instances of that linespec match may occur.

Furthermore, the system can also dynamically generate a ToC based on the combination of the text of the annotated configuration lines and corresponding linespecs in the grammar. The system can use unique phrases to generate a sub-heading when multiple configuration lines correspond to the same linespec. For example, if the system annotates a plurality of configuration lines with a label corresponding to VLANs, the system can generate a ToC entry for VLAN. Suppose that a label associated with "VLAN" annotates configuration lines of VLANs x, y, and Z. The system can then generate ToC entries with sub-headings for VLANs x, y, and Z. By annotating the configuration file with labels that match the corresponding linespecs and generating the ToC, the system can allow a user to efficiently navigate different sections of the configuration file.

In this disclosure, the term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

Network Architecture

FIG. 1 illustrates an exemplary network facilitating auto-annotation and dynamic display for switch configurations, in accordance with an embodiment of the present application. A network 100 can include switches 102, 104, and 106. Network 100 can also include a management device 108 coupled to switch 104 (e.g., via one or more links and/or nodes). Management device 108 can allow a user 120 (e.g., a network administrator) to configure a respective switch of network 100, such as switch 104. In some embodiments, network 100 is a Gen-Z network, and a respective switch of network 100, such as switch 104, is a Gen-Z component. Under such a scenario, communication among the switches in network 100 is based on memory-semantic communications. A respective packet forwarded via network 100 may be referred to as a transaction, and the corresponding data unit can be a flit. In some further embodiments, network 100 can be an Ethernet, InfiniBand, or other networks, and may use a corresponding communication protocol, such as Internet Protocol (IP), FibreChannel over Ethernet (FCoE), or other protocol.

A configuration file 112 of switch 104 can include the configuration based on which switch 104 operates. Configuration file 112 can include several thousand lines directed to different services and protocols deployed by switch 104. Therefore, navigating configuration file 112 can be challenging. With existing technologies, user 120 may use a text editor to view configuration file 112. The editor can be equipped with a scrollbar that can be used to scroll up or down to view different portions of configuration file 112. The scrollbar can be annotated with pop-up help that can indicate the page number, section header, or a small thumbnail view of the content of the current view of configuration file 112.

The editor may also allow user 120 to search for specific text in configuration file 112. By accessing the matched instances (e.g., by providing input on them), the corresponding text can be located within configuration file 112. Furthermore, if configuration file 112 is annotated with markup indicating the headings and sub-headings, the editor may incorporate the annotations into a table of contents. However, some of these techniques may require manual intervention. Moreover, even with these techniques, navigating through configuration file 112 may remain cumbersome. Consequently, configuring a large number of switches in network 100 by editing lines of corresponding configuration files can be error-prone and tedious.

To solve this problem, a configuration management system 140 can present an enhanced edition of a configuration editor on interface 110. Examples of interface 110 can include, but are not limited to, a textual interface (e.g., a command-line interface or CLI), a graphical user interface (GUI), a virtual or augmented reality interface, a voice-command-based interface, and a gesture-based interface. System 140 can operate on switch 104 or management device 108 (e.g., operating as a configuration server). System 140 can also operate in a client-server mode and operate on both switch 104 and management device 108. System 140 can pre-process the text of configuration file 112 before presenting the text to user 120. The processing can include matching a respective line of configuration file 112 to a grammar definition in a switch grammar 114 and creating a merged and overlay view for all documents in the session. Since grammar 114 stores line specifications, grammar 114 can also be referred to as a specification file.

Grammar 114 can store the switch grammar, which can indicate the format of a respective line of configuration file 112 (e.g., a configuration command). In other words, grammar 114 can indicate the format of a respective configuration command supported by switch 104. The switch grammar in grammar 114 can include a set of line specifications, each of which can indicate a format for all variants, including unique identifiers and keywords, of a configuration command. A line specification of grammar 114 can be referred to as a linespec. For example, a configuration command for configuring a VLAN with identifier 100 in switch 104 can be "vlan 100" or "VLAN 100." Here, "VLAN" can be the keyword, and "100" can be the unique identifier since "100" uniquely identifies the configured VLAN.

To present a pre-processed version of configuration file 112 to user 120, system 140 can match a respective line of configuration file 112 to a linespec in grammar 114. Interface 110 can then display the pre-processed configuration file 112 as a rich and editable document to user 120. In response to a respective edit via interface 110 to configuration file 112, system 140 can repeat the pre-processing operations. To further enhance the pre-processing operations, system 140 can annotate one or more linespecs with a label. The label can indicate the type of configuration commands indicated by the linespecs. For example, if a set of linespecs indicate the format of the configuration commands that can configure a VLAN in switch 104, system 140 can annotate the linespecs with a "VLAN" label. Upon incorporating the labels into grammar 114, system 140 can parse configuration file 112. System 140 can dynamically generate labels corresponding to the labels of the matched linespec and annotate configuration file 112 with the labels. If multiple configuration lines (i.e., the configuration commands) in configuration file 112 match the same linespec, system 140 can associate the configuration lines to the same label.

For example, multiple configuration lines associated with different VLANs configured for switch 104 can match the same linespec associated with the configuration of a VLAN. Based on the matching, system 140 can obtain the VLAN label from grammar 114 and annotate the configuration lines with the VLAN label. If the command lines with the VLAN label are sparsely defined in configuration file 112, system 140 can update configuration file 112 such that the configuration lines are combined or made adjacent in configuration file 112. In this way, system 140 can sort configuration file 112 based on the order of the matching with the linespecs. Consequently, by labeling the first instance of a linespec match, system 140 can insert a label in configuration file 112 where the subsequent instances of that linespec match may occur. Furthermore, system 140 can also dynamically generate a ToC 116 based on the combination of the text of the annotated configuration line in configuration file 112 and corresponding linespec in grammar 114.

In some embodiments, system 140 can allow user 120 to define a label (or sub-label) for a configuration line in configuration file 112. System 140 can then record and store the user-defined label in association with the configuration line. When configuration file 112 is displayed on interface 110, system 140 can use the user-defined label. For example, user 120 may annotate configuration file 112 with user-defined labels to designate ports to administrators. For such user-defined labels, system 140 can sort the labels based on the configuration of switch 104. User 120 may also define labels that can be applicable to all configuration lines that map to the same linespec of grammar 114.

Figure 2A:
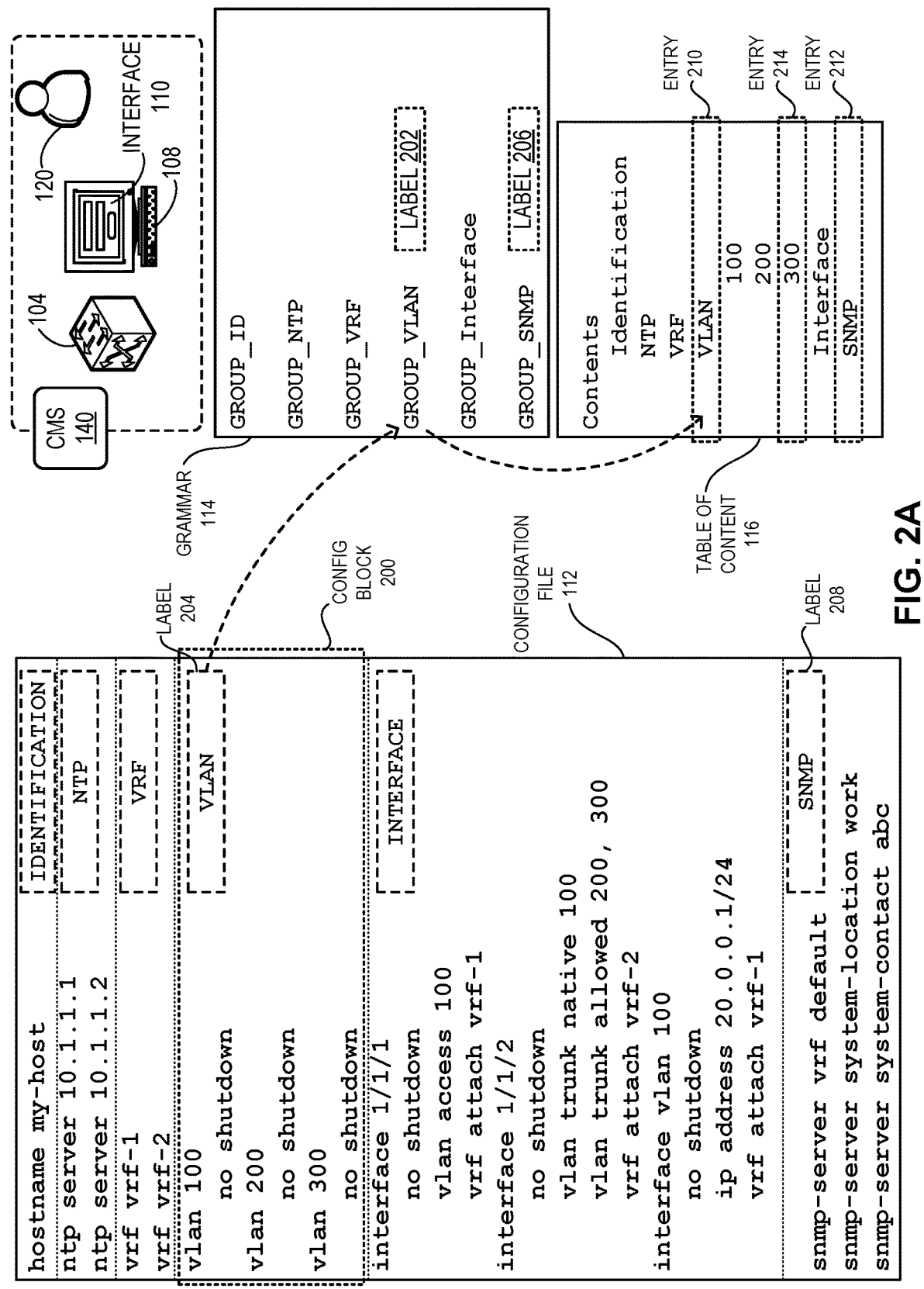
FIG. 2A illustrates exemplary auto-annotation of a switch configuration file and dynamic entry generation of a table of contents (ToC) of the switch configuration, in accordance with an embodiment of the present application.

FIG. 2A illustrates exemplary auto-annotation of a switch configuration file and dynamic entry generation of a ToC of the switch configuration, in accordance with an embodiment of the present application. To annotate configuration file 112, system 140 can determine a set of labels for the annotation. In some embodiments, system 140 can parse grammar 114 and determine similar linespecs, which may appear adjacent to each other within grammar 114. The system can then allocate a common label to the grouped linespecs (or linespec group). For example, grammar 114 can include a plurality of linespecs directed to different configuration elements, such as:

```
"commands" : [
    ...
    {"command" : "hostname WORD",
        "group" : " GROUP_ID" },
    {"command" : "ntp-server IP_ADDRESS",
        "terms" : [ { "i" : 1, "uid" : true } ],
        "group" : " GROUP_NTP" },
    {"command" : "vrf WORD",
        "terms" : [ { "i" : 1, "uid" : true } ],
        "group" : " GROUP_VRF" } ,
    {"command" : "vlan <1-4094>",
        "terms" : [ { "i" : 1, "uid" : true } ],
        "group" : " GROUP_VLAN" },
    {"command" : "interface PHYSIFNAME",
        "terms" : [ { "i" : 1, "uid" : true } ],
        "group" : " GROUP_Interface" },
    {"command" : "interface vlan <1-4094>",
        "terms" : [ { "i" : 2, "uid" : true } ],
        "group" : " GROUP_Interface" },
    {"command" : "snmp-server vrf WORD",
        "terms" : [ { "i" : 2, "uid" : true } ],
        "group" : " GROUP_SNMP" },
    {"command" : "snmp-server (system-location | system-contact) WORD",
        "group" : " GROUP_SNMP" } ,
    ...
]
```

System 140 can determine the linespecs for different configuration commands that can configure Simple Network Management Protocol (SNMP) on switch 104. System 140 can then group these linespecs into a common "GROUP_SNMP" linespec group indicating the SNMP configuration command formats and annotate the linespec group with a label 206 corresponding to SNMP.

System 140 can group a plurality of linespecs of grammar 114 if the number of terms and keywords that the corresponding commands have in common exceeds a threshold. System 140 may maintain an exclusion list to prevent known similar-looking commands from being grouped. In the example above, since common terms and keywords in the configuration commands associated with SNMP can exceed the threshold, system 140 can group the corresponding linespecs. Accordingly, system 140 can then allocate a single label 206 to the linespec group. The system may also include other group characteristics, such as a group priority (e.g., for priority-based ordering relative to other groups) and a regular expression representing the linespec group, in grammar 114.

In some embodiments, system 140 can generate a group table in grammar 114 and store information associated with a respective linespec group, such as the group name, a corresponding label, and the group characteristics, in the table. For example, grammar 114 can include the following group table:

```
"groups: {
    "GROUP_ID" : { "label" : "ID" },
    "GROUP_NTP" : { "label" : "NTP" },
    "GROUP_VRF" : { "label" : "VRF" },
    "GROUP_VLAN" : { "label" : "VLAN" },
    "GROUP_Interface" : { "label" : "Interface" },
    "GROUP_SNMP" : { "label" : "SNMP" },
}
```

Here, label 206 of "GROUP_SNMP" linespec group can be "SNMP." Based on the grouping, a linespec group in grammar 114 may include a single linespec marked with a label. Hence, a label can correspond to one or more linespecs in grammar 114. Upon incorporating the labels into grammar 114, system 140 can parse configuration file 112.

System 140 can then match a respective line of configuration file 112 to a linespec of grammar 114. System 140 can dynamically generate labels corresponding to the matched linespec and annotate configuration file 112 with the labels. If multiple configuration lines in configuration file 112 can match the same group of linespecs in grammar 114, system 140 can annotate the configuration lines with the corresponding label. For example, multiple configuration lines in configuration block 200 of configuration file 112 can match the same group of linespecs associated with the VLAN configuration. Based on the matching, system 140 can obtain a label 202 from grammar 114 and annotate the configuration lines in configuration block 200 with a corresponding label 204. Similarly, system 140 can obtain label 206 from grammar 114 and annotate the matched configuration lines with a corresponding label 208. In some embodiments, labels 202 and 204 can be the same label. System 140 may also maintain a mapping between labels 202 and 204. In this way, interface 110 can allow quick navigation between configuration file 112 and grammar 114.

If the command lines with VLAN label 204 are sparsely defined in configuration file 112, system 140 can update configuration file 112 such that the configuration lines are combined or made adjacent into configuration block 200. Similarly, system 140 can update configuration file 112 such that the configuration lines associated with the interfaces are combined or made adjacent. In this way, system 140 can sort configuration file 112 based on the order of the matching with the linespecs of grammar 114. For example, if the linespecs for VLANs appear before the linespecs for interfaces in grammar 114, the configuration lines of VLANs can appear the configuration lines for interfaces in configuration file 112. In other words, the order in which the groups of linespecs appear in grammar 114, the corresponding configuration lines can appear in the same order in configuration file 112.

Consequently, by labeling the first instance of a linespec match, such as a VLAN linespec match, system 140 can insert label 204 in configuration file 112 where the subsequent instances of the VLAN linespec match may occur (i.e., the subsequent lines of configuration block 200). Furthermore, system 140 can also dynamically generate ToC 116 based on the combination of the text of configuration file 112 and the corresponding linespec in grammar 114. For example, system 140 can obtain the keyword "VLAN" from the configuration lines associated with label 204 and generate a corresponding ToC entry 200 for VLAN. Similarly, system 140 can obtain the keyword "SNMP" from the configuration lines associated with label 208 and generate a corresponding ToC entry 212 for SNMP.

Moreover, system 140 can use unique phrases (e.g., terms and identifiers) to generate a sub-heading (or sub-entries) when multiple configuration lines correspond to the same linespec group. For example, if system 140 annotates a plurality of configuration lines with label 204 corresponding to VLANs, system 140 can generate a ToC entry 210 for VLAN. In configuration file 112, label 204 is associated with "VLAN" and annotates configuration lines of VLANs 100, 200, and 300. Since the unique identifiers for VLANs are 100, 200, and 300, system 140 can then generate ToC sub-entries with sub-headings for VLANs 100, 200, and 300. For example, since configuration block 200 includes configuration for VLAN 300, system 140 can generate a sub-entry 214 for VLAN 300 under entry 210 for VLAN. By annotating configuration file 210 with labels that match the corresponding linespecs in grammar 114 and generating ToC 116, system 140 can allow user 120 to efficiently navigate different sections of configuration file 112 via interface 110. For example, user 120 can select entry 210 from ToC 116, which can move a current view of interface 110 to include code block 200. In addition, system 140 may also highlight code block 200 in interface 110.

System 140 can also map similar but unequal terms when the corresponding linespecs in grammar 114 are not fully consistent. For example, system 140 can identify that "vlan ([0-9]+)" can correspond to "vlan\1" and "(attribute|advertise|suppress)-map (\w+)" can correspond to "route-map\1". Here, the special character "\1" can refer to "the first linespec group that matches the regular expression," and the special character "\w" can refer to "any string with [A-Za-z0-9_]".

Figure 2B:
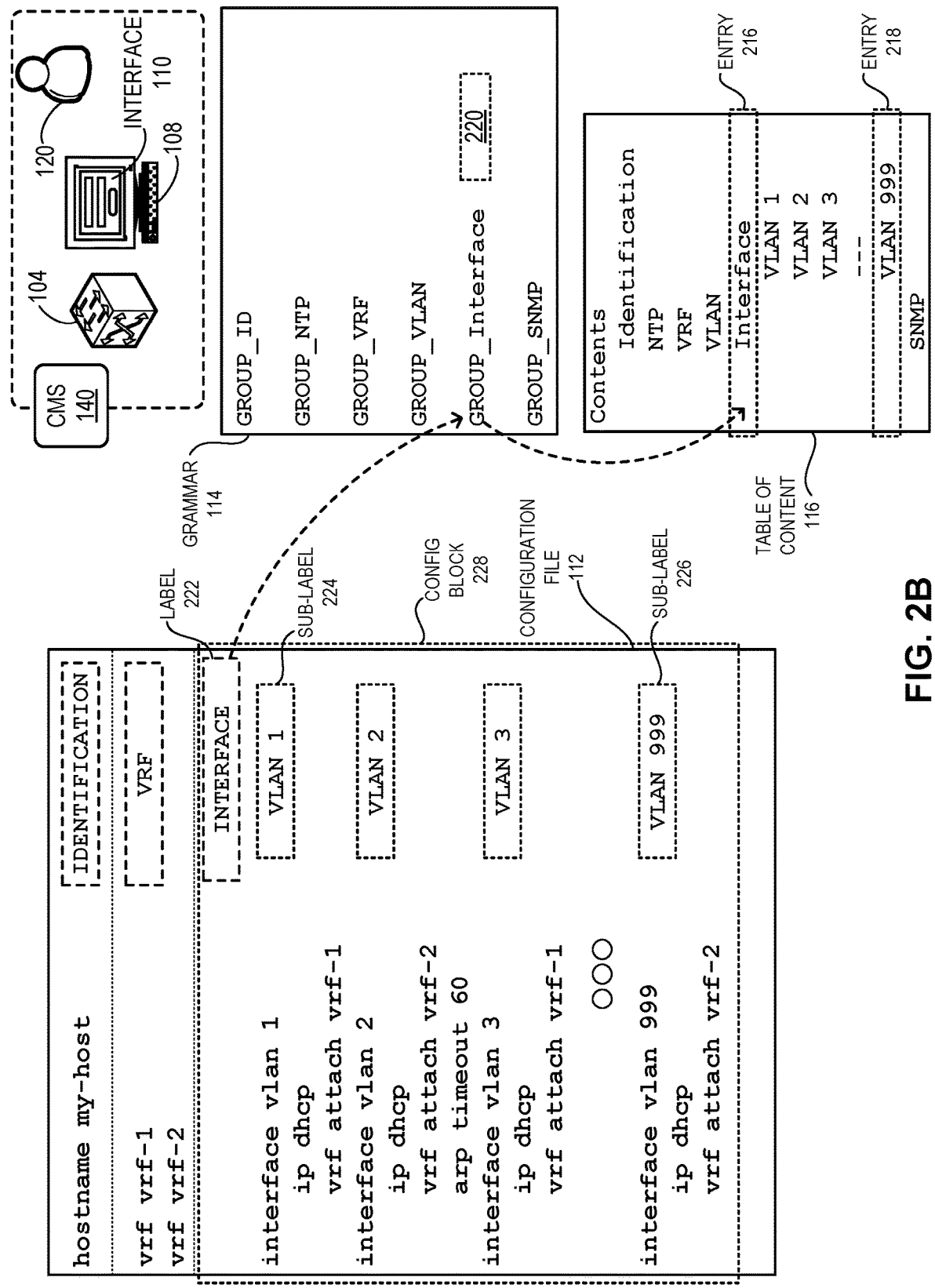
FIG. 2B illustrates an exemplary generation of sub-labels for auto-annotation of a switch configuration file and dynamic entry generation of the ToC, in accordance with an embodiment of the present application.

FIG. 2B illustrates an exemplary generation of sub-labels for auto-annotation of a switch configuration file and dynamic entry generation of the ToC, in accordance with an embodiment of the present application. A linespec group of grammar 114 may correspond to a large number of configuration lines in configuration file 112. As a result, a single label for a linespec group may not provide sufficient granularity for efficient navigation of configuration file 112. For example, system 140 may annotate configuration file 112 with a label 222 indicating "interface" based on a corresponding label 220 of a "GROUP_Interface" linespec group of grammar 114. However, user 120 may define a large number of VLAN interfaces for switch 104 in configuration block 228. A respective VLAN interface can correspond to a plurality of configuration lines in configuration file 112. Consequently, label 222 may correspond to a large number of configuration lines in configuration block 228.

To provide more granular annotation, system 140 may parse the unique identifiers (e.g., terms or phrases) from the matched linespec to generate a sub-label within the context of an outer higher-order label. A respective configuration line of configuration block 228 may match the "GROUP_Interface" linespec group of grammar 114 based on the following linespec:

```
"commands" : [
  ...
  {"command" : "interface vlan <1-4094>",
   "terms" : [ { "i" : 2, "uid" : true } ],
   "group" : "GROUP_Interface" },
  ...
]
```

System 140 can automatically generate a sub-label definition based on the information from the matched linespec (i.e., from the definition of the "GROUP_Interface" linespec group). Since the linespec indicates that the unique identifier should be at index=2, system 140 can indicate in the sub-label definition that the unique identifier should appear at a position corresponding to an index value of 2. For example, system 140 may generate the following sub-label definition for a respective VLAN interface:

```
"groups: {
  "GROUP_Interface" : {
    "label" : "Interface",
    "sub-label" : {
      "format" : "%d", "params" : [ "i" : 2 ]
    }
  },
}
```

In this sub-label definition, the "sublabel" field can indicate a format for the sub-label. The format can indicate that the sub-label should include the phrase "VLAN" followed by the configuration value at index 2 of the matched configuration line.

Based on this sub-label definition, system 140 can generate a sub-label 224 corresponding to "VLAN 1" for the configuration line with "interface vlan 1." Similarly, system 140 can generate a sub-label 226 corresponding to "VLAN 999" for the configuration line with "interface vlan 999." For a respective sub-label, system 140 can also generate a sub-entry with a sub-heading in ToC 116. For entry 216 for "Interface" in ToC 116, system 140 can generate a sub-entry with a corresponding sub-heading indicating a respective VLAN interface in configuration block 228. For example, for sub-label 226, system 140 can generate a sub-entry 218 for interface VLAN 999 under entry 216 for ToC 116.

Figure 2C:
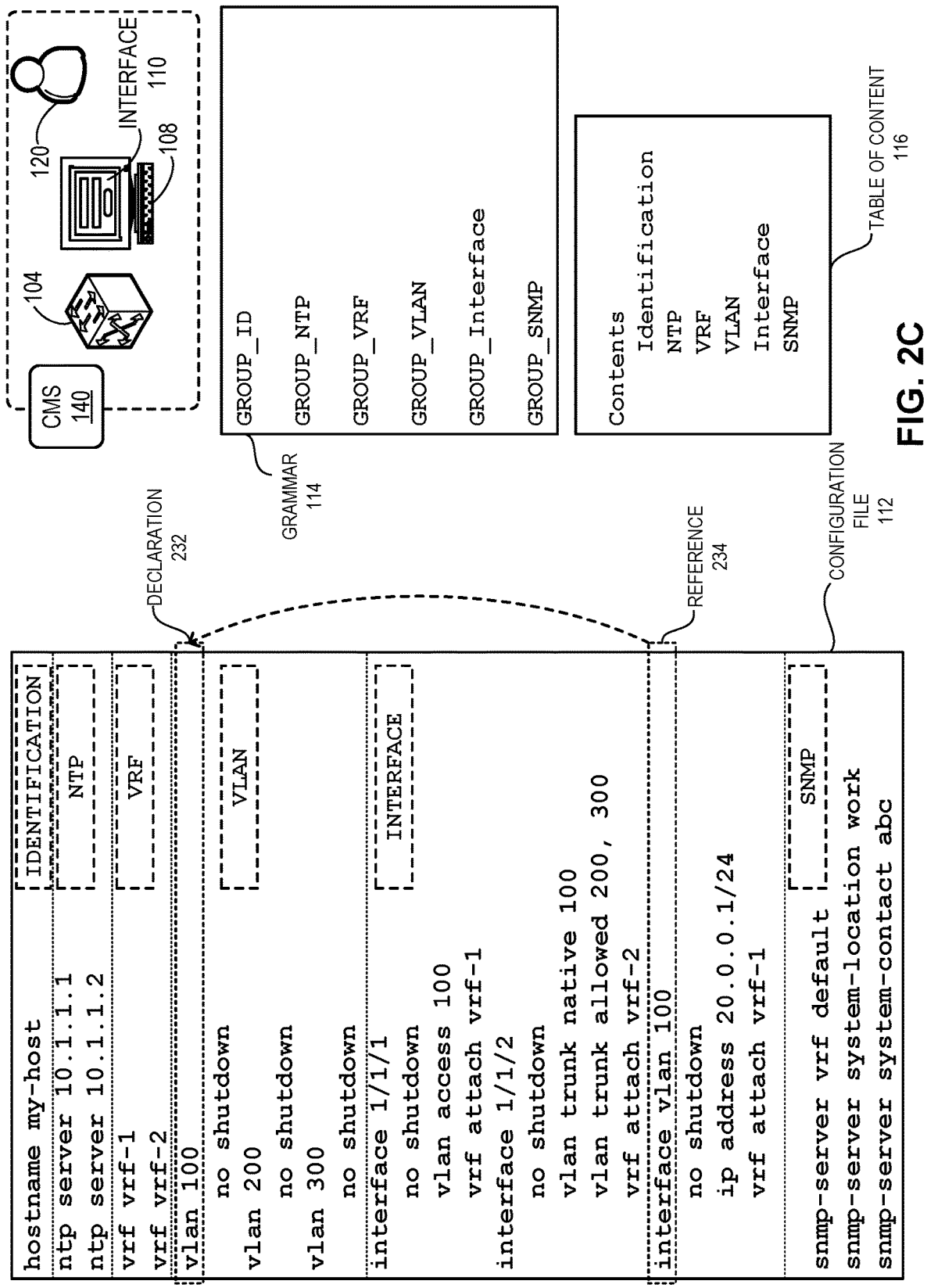
FIG. 2C illustrates an exemplary generation of reference labels in a switch configuration file, in accordance with an embodiment of the present application.

In some embodiments, system 140 can include references within configuration file 112. FIG. 2C illustrates an exemplary generation of reference labels in a switch configuration file, in accordance with an embodiment of the present application. A configuration line in configuration file 112 can declare (or define) a configuration object, such as a VLAN or an interface, or refer to a declared configuration object. The declaration can be defined as a configuration line declaring (or instantiating) a configuration object for the configuration of switch 104. A reference can refer to a declaration (i.e., a declaration may be implied from a reference). It should be noted that a reference to an undeclared configuration object can cause a configuration error.

For example, configuration file 112 can include a declaration for VLAN 100. Subsequently, configuration file 112 can include a configuration line that can define an interface for VLAN 100, thereby making a reference to the declaration of VLAN 100. In this way, configuration file 112 may include a large number of references to a declared configuration object. System 140 can annotate the declaration of VLAN 100 with a declaration label 232. On the other hand, system 140 can annotate the declaration of interface VLAN 100 with a reference label 234, which can refer to label 232. As a result, user 120 can navigate from the configuration line of interface VLAN 100 to the declaration of VLAN 100 based on labels 232 and 234 (e.g., by providing an input in interface 110). However, if a VLAN interface is defined for a VLAN that has not been declared, system 140 can indicate a configuration error.

The linespecs in grammar 114 may not include distinguishing features that distinguish references from declarations. Hence, system 140 can compare a respective configuration line with a line format to determine whether the configuration is a declaration or reference. If the configuration line starts with one or more keywords followed by a unique identifier, system 140 can determine that the configuration line is the declaration for the configuration object associated with the unique identifier. On the other hand, if the configuration line includes, but does not start with, one or more keywords followed by a unique identifier, system 140 can determine that the configuration line references the configuration object associated with the unique identifier. The set of keywords can indicate the type of declaration or reference.

Figure 2D:
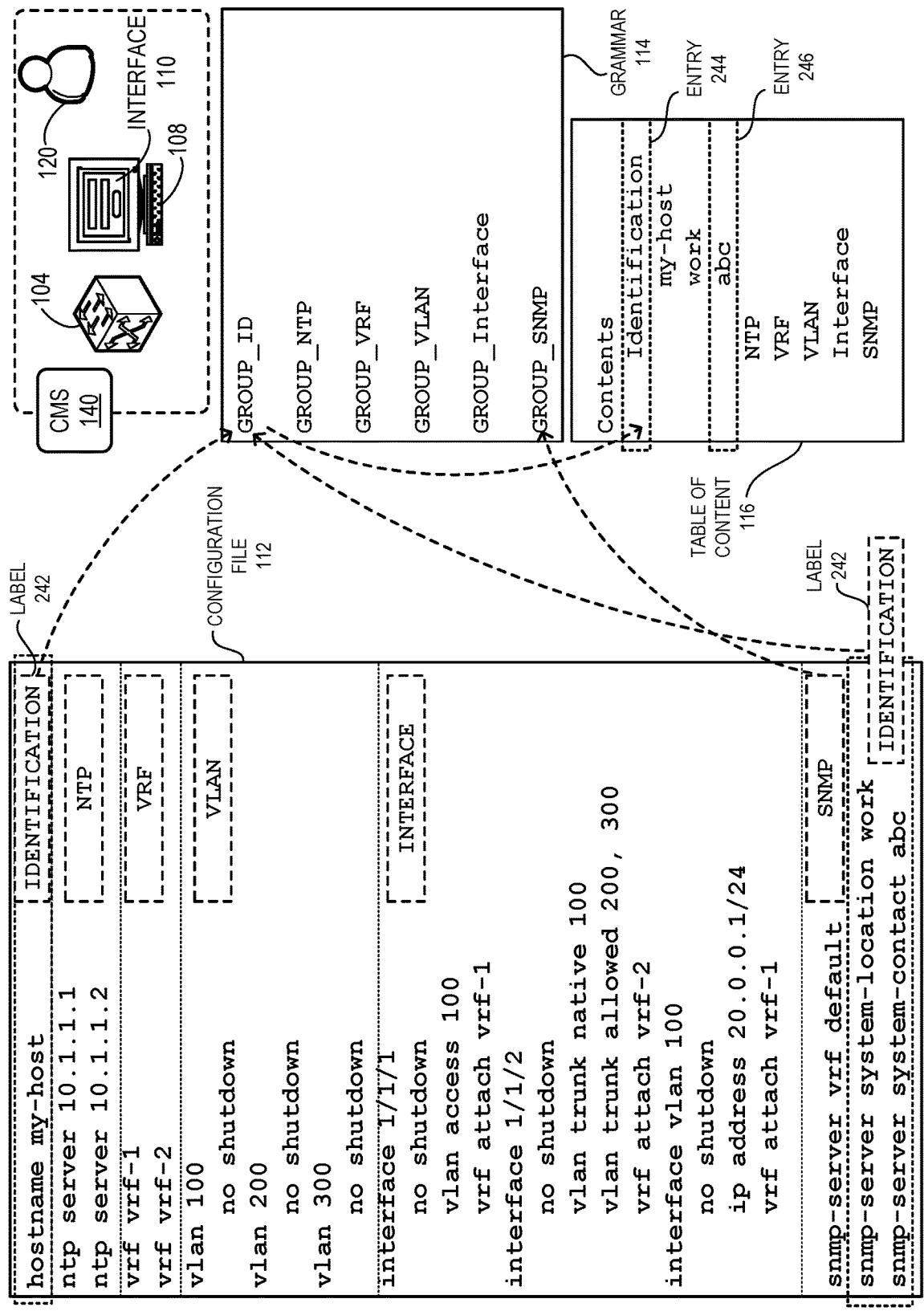
FIG. 2D illustrates an exemplary generation of distributed labels for auto-annotation of a switch configuration file and dynamic entry generation of the ToC, in accordance with an embodiment of the present application.

FIG. 2D illustrates an exemplary generation of distributed labels for auto-annotation of a switch configuration file and dynamic entry generation of the ToC, in accordance with an embodiment of the present application. Some configuration lines in configuration file 112 may correspond to the same label but may not appear adjacent to each other. As a result, configuration lines corresponding to the same label or sub-label may span across multiple non-contiguous configuration lines. In the example in FIG. 2D, label 242 indicating "identification" is associated with configuration lines that appear in non-contiguous configuration lines. To link different segments of configuration file 112 associated with label 242, system 140 can generate a sub-label for a respective segment of configuration file 112 and form a chain of links among the sub-labels. Hence, label 242 can be a distributed (or split) label.

In configuration file 112, some configuration lines can match linespecs corresponding to both SNMP server and identification. Since some of the system identifications are defined in the context of an SNMP server, system 140 can first organize these configuration lines based on a label for SNMP server. System 140 can then associate the configuration lines associated with identification with label 242. System 140 can link the segments of configuration lines using sub-labels. System 140 can also generate a sub-entry in ToC 116 for a respective configuration line corresponding to the identifications under entry 244 for "Identification." For example, system 140 can generate a sub-entry 246 with a corresponding sub-heading indicating an identification of a system contact with respect to an SNMP server. It should be noted that the text of a sub-entry may not be the final phrase of a command line. The sub-entry can include a combination of phrases from the command and external data not present in configuration file 112 (e.g., a network state).

If user 120 provides an input to ToC 116 via interface 110 to select entry 244 (e.g., clicks or touches on "Identification"), system 140 can present the configuration lines associated with label 242. For a respective input, system 140 may navigate from one sub-label to the next sub-label in the chain of sub-labels. System 140 may also navigate from one segment of configuration lines to the next non-contiguous segment accordingly. System 140 may only present the configuration lines associated with label 242 on interface 110 (i.e., the current view of interface 110 reduces to include the configuration lines associated with label 242). In this way, even if some related configuration lines appear as non-contiguous segments in configuration file 112, system 140 can facilitate efficient navigation for the non-contiguous segments based on the annotations.

Figure 2E:
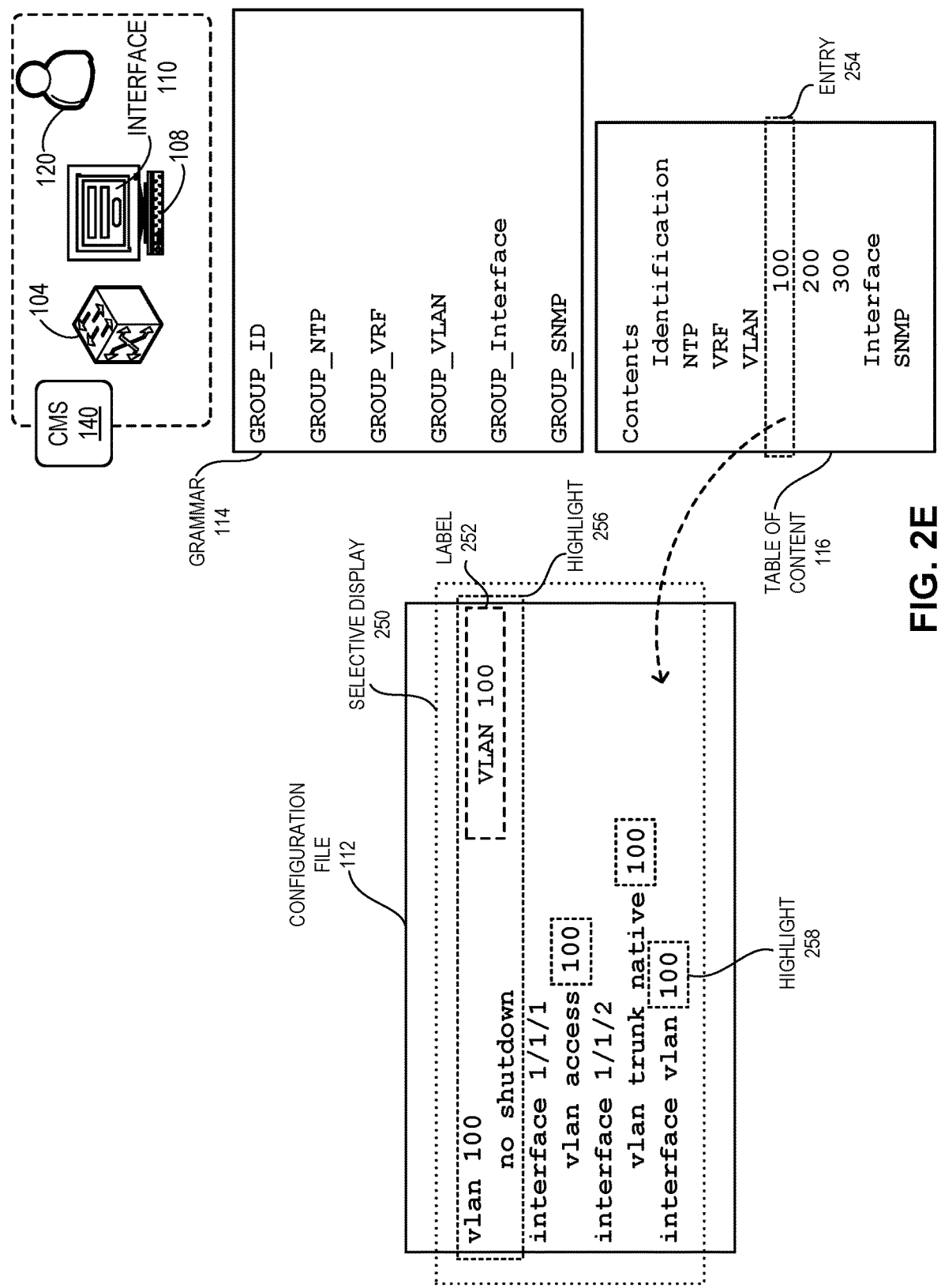
FIG. 2E illustrates an exemplary selective display of a switch configuration file and the ToC based on annotations and references, in accordance with an embodiment of the present application.

FIG. 2E illustrates an exemplary selective display of a switch configuration file and the ToC based on annotations and references, in accordance with an embodiment of the present application. To allow user 120 to efficiently navigate configuration file 112, system 140 can selectively display a reduced view of configuration file 112 on interface 110. The reduced view can include only the configuration lines associated with a label or sub-label selected from ToC 116. Such lines can include the configuration lines annotated with the label and the references to the annotated configuration lines. System 140 can also highlight the reference-related information in the selective display. If the selected label corresponds to a declaration, system 140 can also display the references to that declaration. On the other hand, if the selected label corresponds to a reference, system 140 can also display the declaration linked to that reference.

In this way, the selective display can display the configuration lines that are relevant to the selected label, sub-label, or configuration line. User 120 may determine whether the selective display dynamically updates as new lines are selected. For example, if user 120 selects entry 254 of ToC 116, which corresponds to VLAN 100, system 140 can display the configuration lines relevant to VLAN 100 in selective display 250 on interface 110. Suppose that a label 252 is associated with VLAN 100. The relevant configuration lines can then include the segment of configuration file 112 annotated with label 252, the configuration lines that the annotated segment refers to, and the configuration lines that refers to VLAN 100. System 140 can provide a highlight 256 for the configuration lines annotated with label 252 (e.g., the declaration of VLAN 100). Since entry 254 corresponds to the declaration of VLAN 100, system 140 can also display the configuration liens with the references to that declaration with a highlight 258, which can highlight the reference to VLAN 100.

Figure 3A:
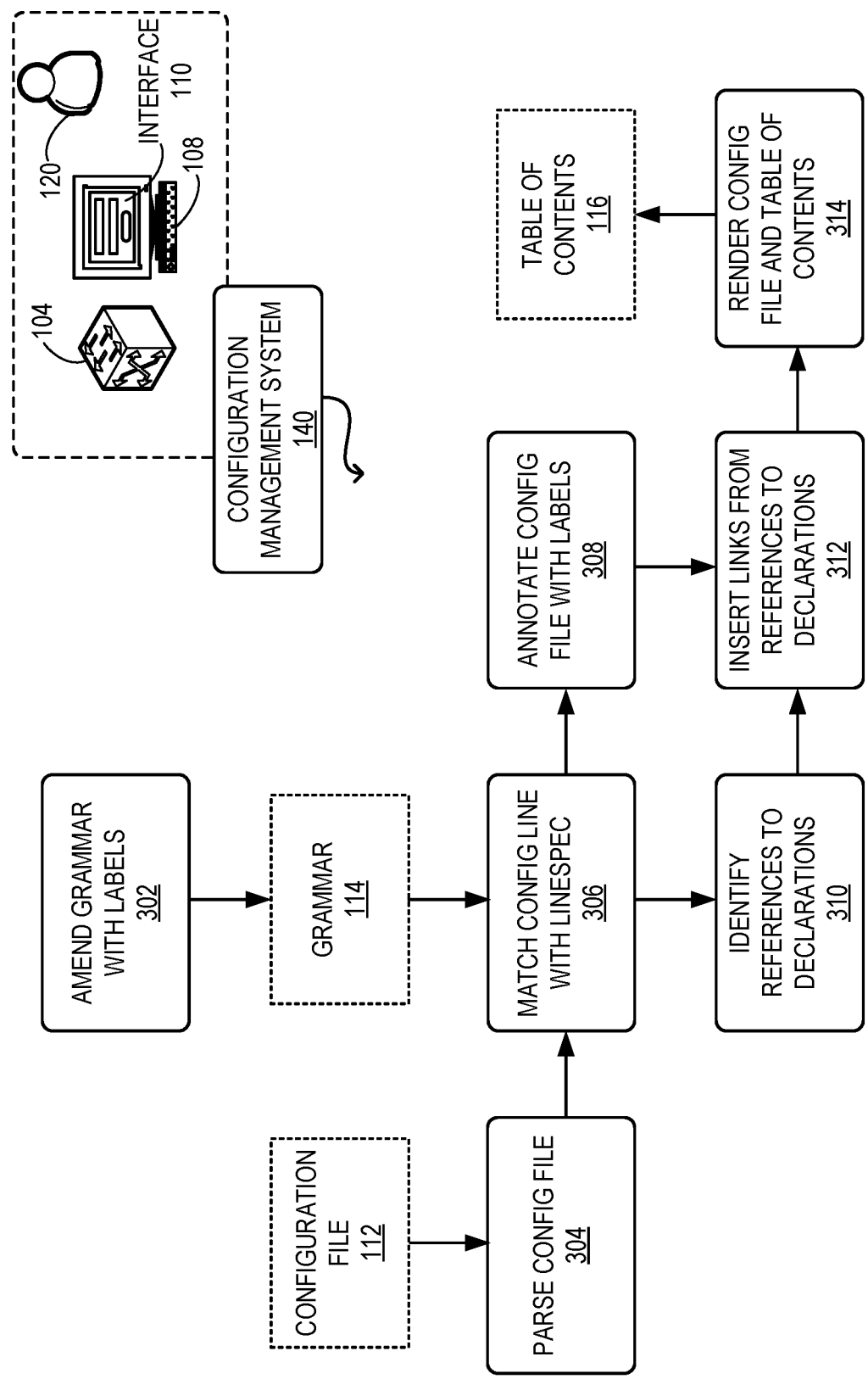
FIG. 3A illustrates an exemplary label-based rendering of switch configurations, in accordance with an embodiment of the present application.

FIG. 3A illustrates an exemplary label-based rendering of switch configurations, in accordance with an embodiment of the present application. The operations of system 140 can be performed at a centralized location (e.g., access device 108 operating as a management server), on switch 104, or a combination of both. Since the same switch grammar for a class of switch can be used for the switches belonging to the class, the switch grammar may not be specific to an individual switch. Hence, system 140 may amend grammar 114 with labels at device 108 (e.g., at the server-side) (operation 302). System 140 can parse configuration file 112 at switch 104 or device 108 (operation 304). It should be noted that once the processing is initiated at switch 104, the subsequent steps can be performed at switch 104.

Based on the parsing, system 140 can match a respective configuration line of configuration file 112 with a linespec of grammar 114 (operation 306) and annotate configuration file 112 with labels accordingly (operation 308), as described in conjunction with FIGS. 2A and 2B. System 140 can also identify the references and declarations in configuration file 112 (operation 310). Based on the annotations, system 140 can insert links from the identified references to the corresponding declarations (operation 312), as described in conjunction with FIG. 2C. System 140 can then render configuration file 112 and ToC 116 (operation 314). The rendering operation includes generating ToC 116 based on the labels and sub-labels of configuration file 112. ToC 116 may exclude unmatched labels of grammar 114. Such labels can be present in grammar 114 but may not match a configuration line of configuration file 112.

Figure 3B:
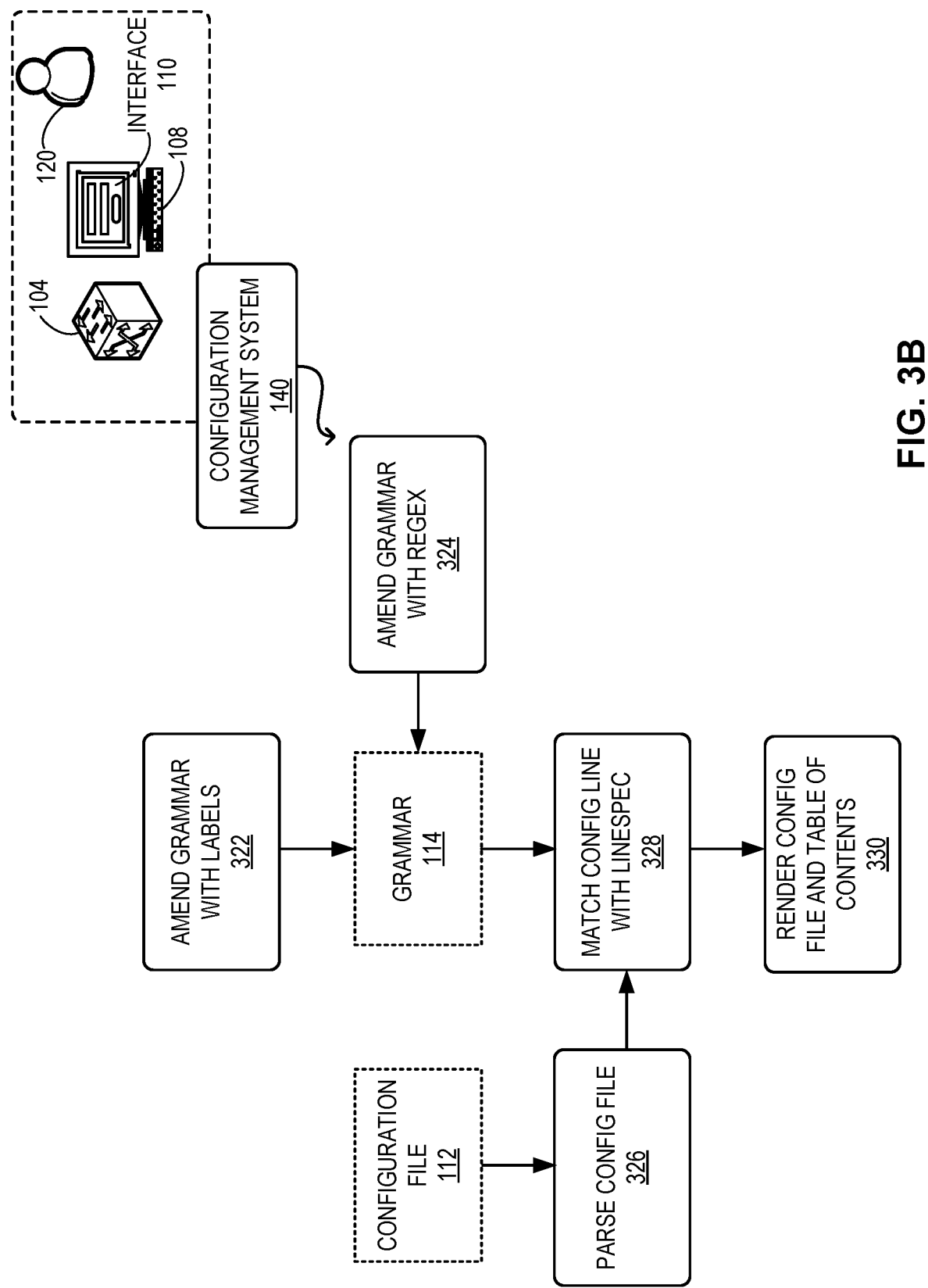
FIG. 3B illustrates an exemplary regular-expression-based rendering of switch configurations, in accordance with an embodiment of the present application.

In some embodiments, system 140 can use a regular expression (regex) for matching the configuration lines with linespecs. FIG. 3B illustrates an exemplary regular-expression-based rendering of switch configurations, in accordance with an embodiment of the present application. To facilitate the regular-expression-based matching and rendering, system 140 can amend grammar 114 with labels (operation 322). System 140 can add a regular expression to a linespec based on the definition specified in the linespec. In other words, the regular expression may be generated from the switch grammar. For example, the regular expression for matching a linespec associated with a VLAN interface can be "^interface vlan [0-9]+". System 140 can generate this regular expression based on the format of the corresponding configuration command defined in the linespec.

System 140 can also include a regular expression to a respective label and sub-label (operation 324). To generate a regular expression for a label, system 140 may incorporate the keywords from the linespecs associated with the label. These keywords may appear verbatim in the regular expression. The regular expressions for the unique identifiers can correspond to the format of the unique identifiers. For example, if a unique identifier can be expressed in a numeric format, such as "<1-4094>," system 140 can indicate "[0-9]+" as the corresponding regular expression. Such a regular expression may match more values (e.g., both 4095 and 5000) compared to a direct match with a linespec. However, even with multiple matches, system 140 can efficiently navigate configuration file 112. Similarly, if a unique identifier can be expressed using alphabetic characters (e.g., a "word" format), system 140 can indicate "\w+" as the corresponding regular expression. If a plurality of linespecs map to the same label, the regular expression for a respective linespec can be logically incorporated (e.g., using a logical "OR") into the regular expression.

Figure 4A:
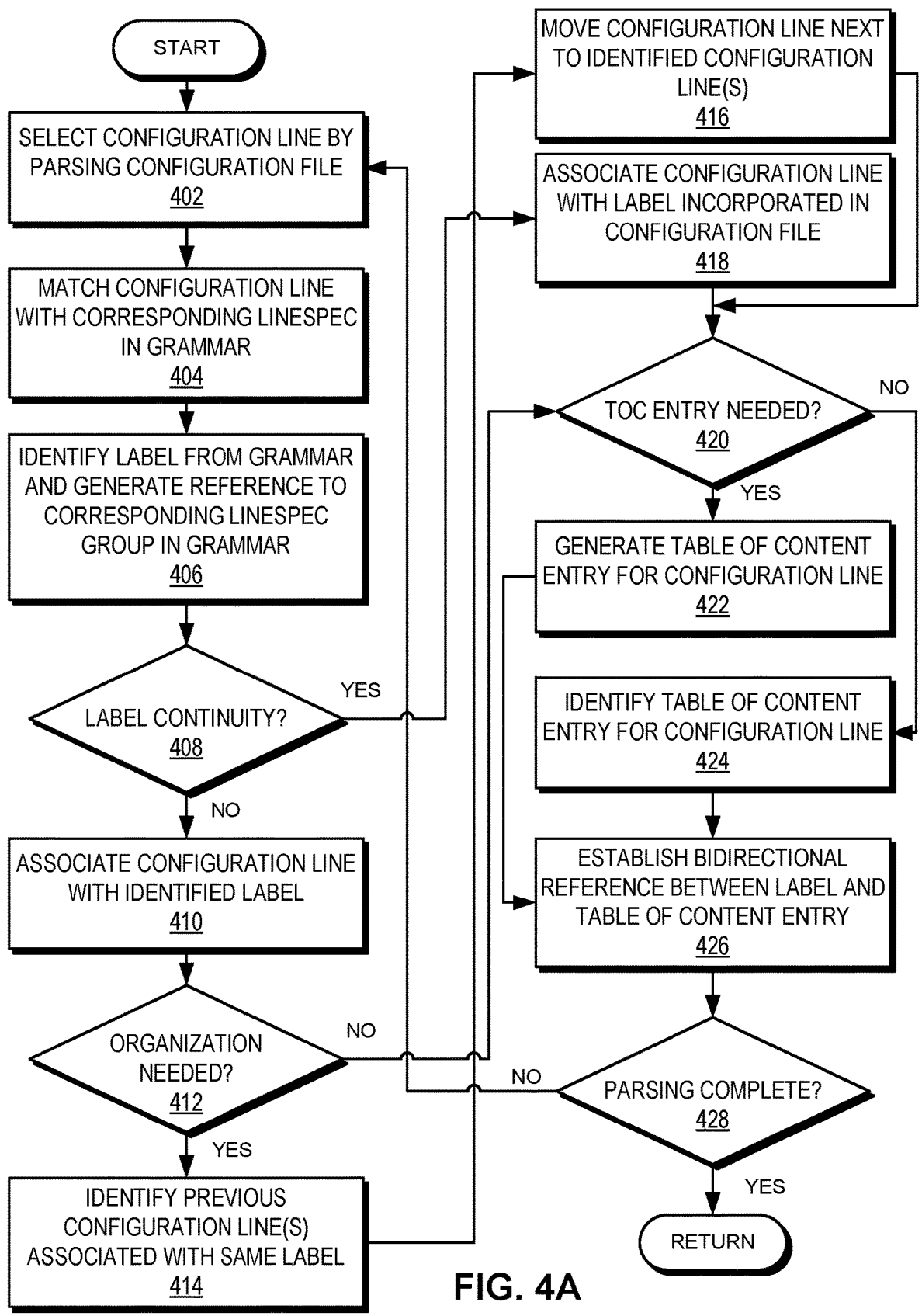
FIG. 4A presents a flowchart illustrating the process of a configuration management system parsing a switch configuration file for auto-annotation and dynamically generating corresponding entries in the ToC, in accordance with an embodiment of the present application.

System 140 can parse configuration file 326 (operation 326) and match a configuration line with the corresponding linespec (or linespecs) based on the regular expressions (operation 328). Since a respective line of configuration file 112 can be compared with the regular expressions in grammar 114, configuration file 112 may not be amended with labels and sub-labels, thereby circumventing the need for modifying configuration file 112. System 140 can then render configuration file 112 and ToC 116 (operation 330). System 140 can use the regular expression for a respective label and sub-label to dynamically construct ToC 116. System 140 can then use regular expressions associated with a respective entry of ToC 116 to navigate configuration file 112. For example, if user 120 selects an entry, system 140 can use the regular expression for that entry to find the instance in configuration file 112. By using regular expressions, system 140 can reduce the pre-processing overhead. Operations FIG. 4A presents a flowchart illustrating the process of a configuration management system parsing a switch configuration file for auto-annotation and dynamically generating corresponding entries in the ToC, in accordance with an embodiment of the present application. During operation, the system can select a configuration line by parsing a configuration file (operation 402) and match the configuration line with the corresponding linespec in the grammar (operation 404). The system can identify the label from the grammar and generate a reference to the corresponding linespec group in the grammar (operation 406). The reference allows the system to navigate to the matched linespec group. The identified label can include a sub-label of another label.

The system can then determine whether the configuration line has label continuity (operation 408). The label continuity indicates whether the configuration line is associated with the same label as the previous configuration line. Upon determining label continuity for the configuration line, the system can associate the configuration line with the label incorporated in the configuration file (i.e., the label used to annotate the previous line) (operation 418). On the other hand, if the configuration line does not have label continuity, the system can associate the configuration line with the identified label (operation 410). The system can then determine whether an organization is needed for the configuration line (operation 412). The configuration line may need organization if a previously parsed configuration line is associated with the same label and the current configuration line is not associated with another superseding label.

If an organization is needed, the system can identify the previous configuration line(s) associated with the same label (operation 414) and move the configuration line next to the identified configuration line(s) (operation 416). Upon associating the configuration line with the label incorporated in the configuration file (operation 418) or if an organization is not needed (operation 412), the system can determine whether the configuration line needs a ToC entry (operation 420). If a ToC entry is needed, the system can generate a ToC entry for the configuration line (operation 422).

If a ToC entry is not needed, the system can identify a ToC entry for the configuration line (operation 424). Upon generating or identifying the ToC entry, the system can establish a bidirectional reference between the label and the ToC entry (operation 426) and determine whether the parsing is complete (operation 428). The bidirectional reference allows a user to navigate between the configuration line and the entry. For example, clicking or touching on one of them can navigate to the other one. If the parsing is complete, the system can continue to select the next configuration line by parsing the configuration file (operation 402).

Figure 4B:
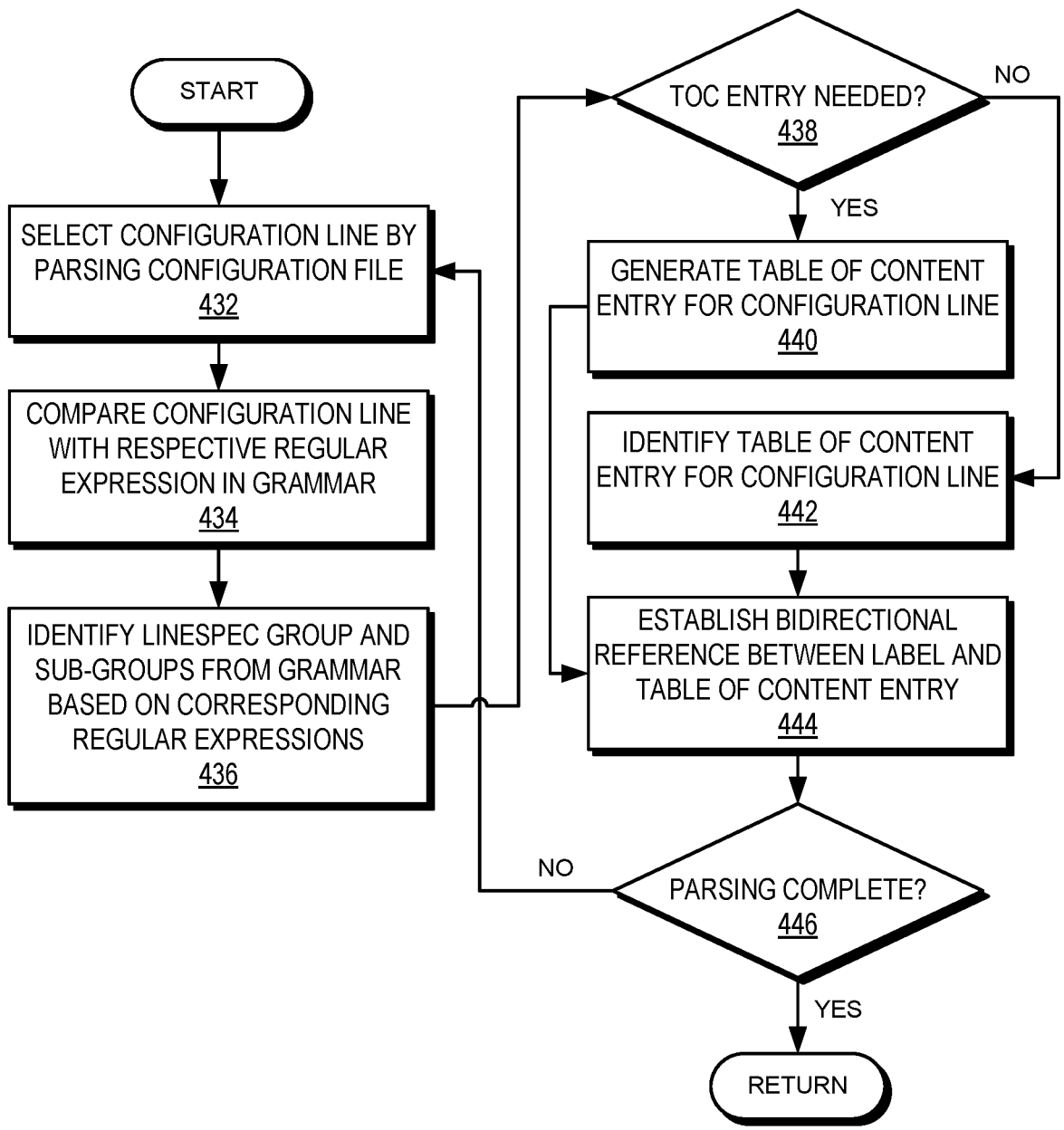
FIG. 4B presents a flowchart illustrating the process of a configuration management system parsing a switch configuration file based on regular expressions and dynamically generating corresponding entries in the ToC, in accordance with an embodiment of the present application.

FIG. 4B presents a flowchart illustrating the process of a configuration management system parsing a switch configuration file based on regular expressions and dynamically generating corresponding entries in the ToC, in accordance with an embodiment of the present application. During operation, the system can select a configuration line by parsing a configuration file (operation 432) and compare the configuration line with a respective regular expression in the grammar (operation 434). The system can then identify a linespec group and sub-groups from the grammar based on the corresponding regular expressions (operation 436).

The system can then determine whether the configuration line needs a ToC entry (operation 438). If a ToC entry is needed, the system can generate a ToC entry for the configuration line (operation 440). If a ToC entry is not needed, the system can identify a ToC entry for the configuration line (operation 442). Upon generating or identifying the ToC entry, the system can establish a bidirectional reference between the label and the ToC entry (operation 444). The system can then determine whether the parsing is complete (operation 446). If the parsing is complete, the system can continue to select the next configuration line by parsing the configuration file (operation 432).

Figure 4C:
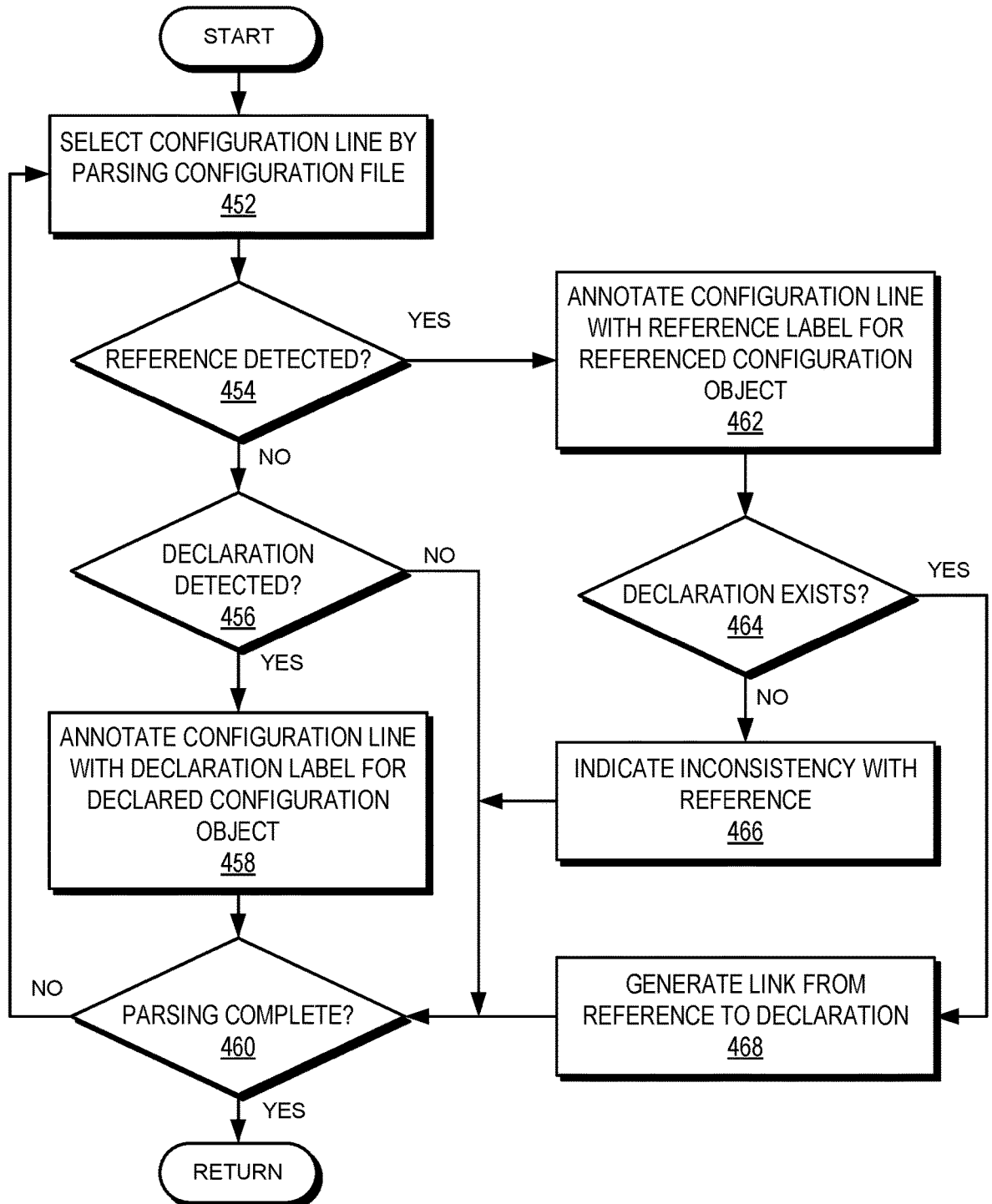
FIG. 4C presents a flowchart illustrating the process of a configuration management system generating reference labels in a switch configuration file, in accordance with an embodiment of the present application.

FIG. 4C presents a flowchart illustrating the process of a configuration management system generating reference labels in a switch configuration file, in accordance with an embodiment of the present application. During operation, the system can select a configuration line by parsing a configuration file (operation 452) and determine whether a reference is detected in the configuration line (operation 454). If a reference of not detected, the system can determine whether a declaration is detected (operation 456). If a declaration is detected, the system can annotate the configuration line with a declaration label for the declared configuration object (operation 458). On the other hand, if a reference is detected, the system can annotate the configuration line with a reference label for the referenced configuration object (operation 462).

The system can then determine whether a declaration for the reference exists (operation 464). If a declaration for the reference exists, the system can generate a link from the reference to the declaration (operation 468). The link can be established based on the labels. On the other hand, if a declaration for the reference does not exist, the system can indicate inconsistency with the reference (e.g., can indicate an error) (operation 466). Upon annotating the configuration line with a declaration label, indicating inconsistency, or generating the link, or if a declaration or reference is not detected (operation 456, 458, 466, or 468), the system can determine whether the parsing is complete (operation 460). If the parsing is complete, the system can continue to select the next configuration line by parsing the configuration file (operation 452).

Figure 4D:
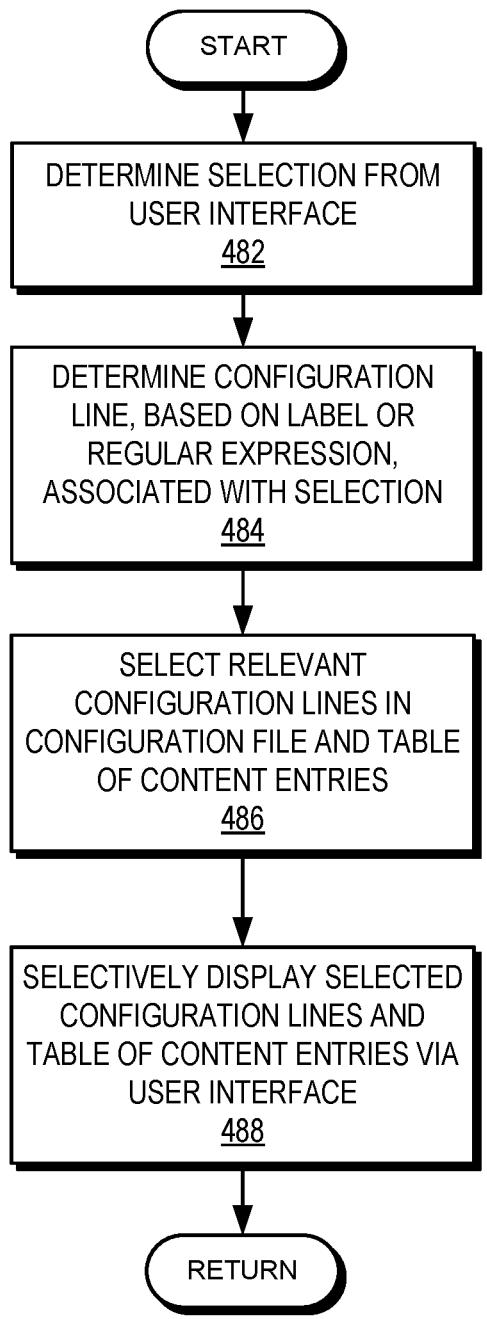
FIG. 4D presents a flowchart illustrating the process of a configuration management system selectively displaying a switch configuration file and the corresponding entries in the ToC, in accordance with an embodiment of the present application.

FIG. 4D presents a flowchart illustrating the process of a configuration management system selectively displaying a switch configuration file and the corresponding entries in the ToC, in accordance with an embodiment of the present application. During operation, the system can determine a selection from a user interface (e.g., an input to a ToC entry) (operation 482) and determine a configuration line, based on a label or a regular expression, associated with the selection (operation 484). The system can then select the relevant configuration lines in the configuration file and ToC entries (operation 484). Subsequently, the system can selectively display the selected configuration lines and ToC entries via the user interface (operation 488).

Figure 5A:
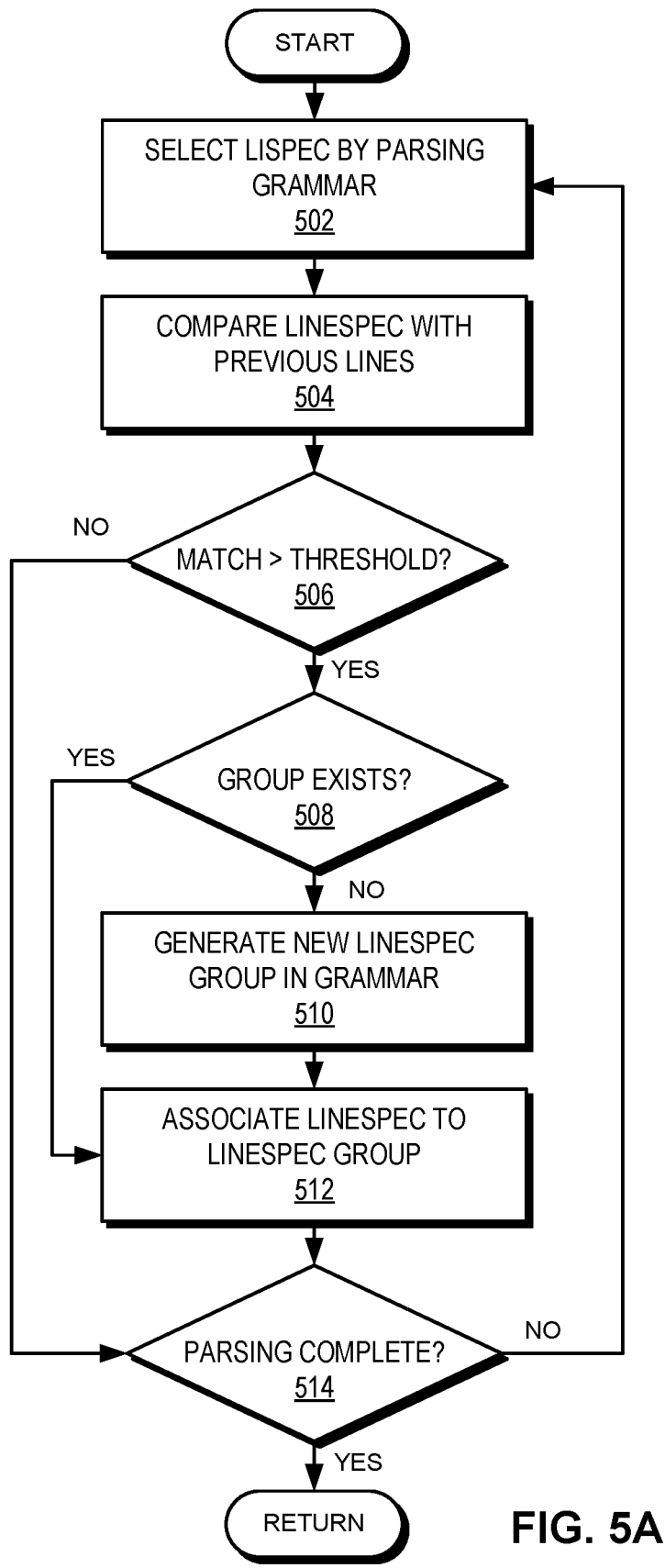
FIG. 5A presents a flowchart illustrating the process of a configuration management system generating linespec groups for the grammar of a switch, in accordance with an embodiment of the present application.

FIG. 5A presents a flowchart illustrating the process of a configuration management system generating linespec groups for the grammar of a switch, in accordance with an embodiment of the present application. During operation, the system can select a linespec by parsing the grammar (operation 502) and compare the linespec with the previous lines (operation 504). The system can then determine whether a match based on the comparison is greater than a threshold (operation 506). For example, the threshold can be based on a number of matched characters or phrases. If the match is greater than the threshold, the system can then determine whether a linespec group for the matched linespecs exists (operation 508).

If the linespec group does not exist, the system can generate a new linespec group in the grammar (operation 510). If the group exists or upon generating the new linespec group (operation 508 or 510), the system can associate the linespec to the linespec group (operation 512). If the match is not greater than the threshold or the linespec is associated with the linespec group (operation 506 or 512), the system can determine whether the parsing is complete (operation 514). If the parsing is complete, the system can continue to select the next linespec by parsing the grammar (operation 502).

Figure 5B:
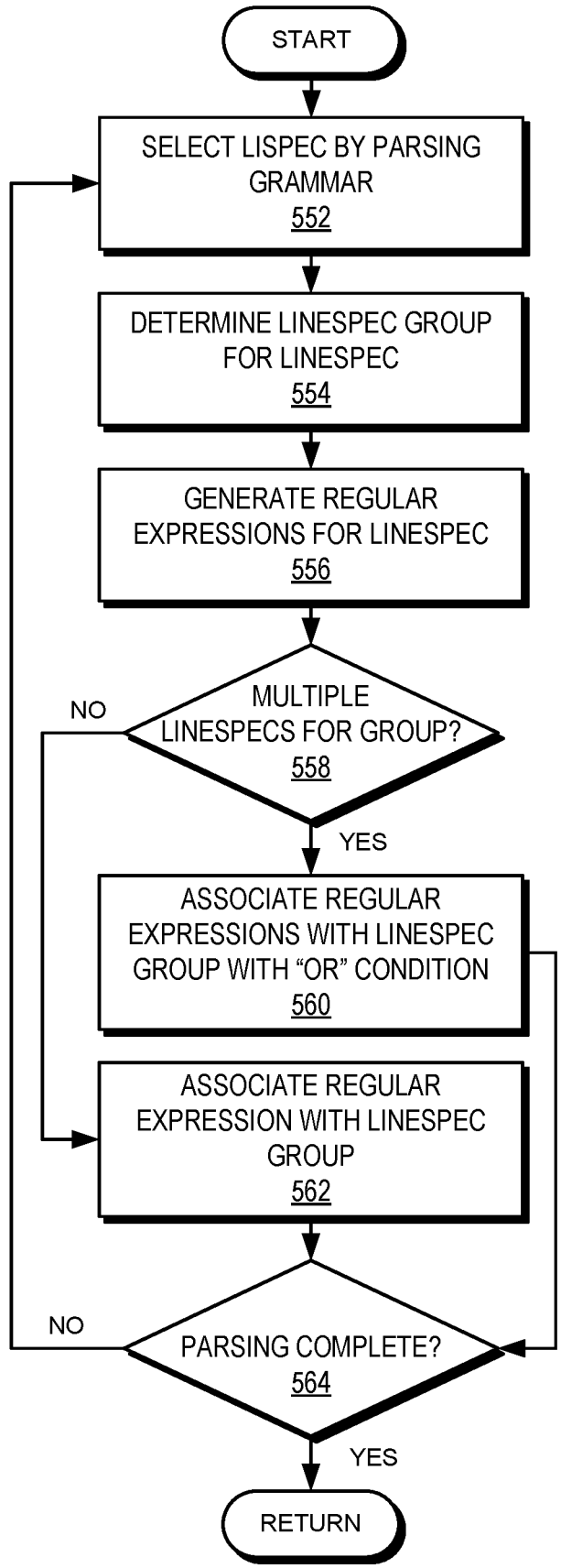
FIG. 5B presents a flowchart illustrating the process of a configuration management system generating regular expressions for the switch grammar of a switch, in accordance with an embodiment of the present application.

FIG. 5B presents a flowchart illustrating the process of a configuration management system generating regular expressions for the switch grammar of a switch, in accordance with an embodiment of the present application. During operation, the system can select a linespec by parsing the grammar (operation 552) and determine the linespec group for the linespec (operation 554). The system can then generate a regular expression for the linespec (operation 556) and determine whether multiple regular expressions exist for the linespec group (operation 558). If multiple regular expressions exist, the system can associate the multiple regular expressions with the linespec group with an "OR" condition (operation 560).

On the other hand, if multiple regular expressions do not exist, the system can associate the regular expression with the linespec group (operation 562). If a subsequent linespec is added to this linespec group, the regular expression of that subsequent linespec can be associated with the linespec group with the OR condition. Upon associating regular expression(s) with the linespec group (operation 560 or 562), the system can determine whether the parsing is complete (operation 564). If the parsing is complete, the system can continue to select the next linespec by parsing the grammar (operation 502).

Exemplary System

Figure 6:
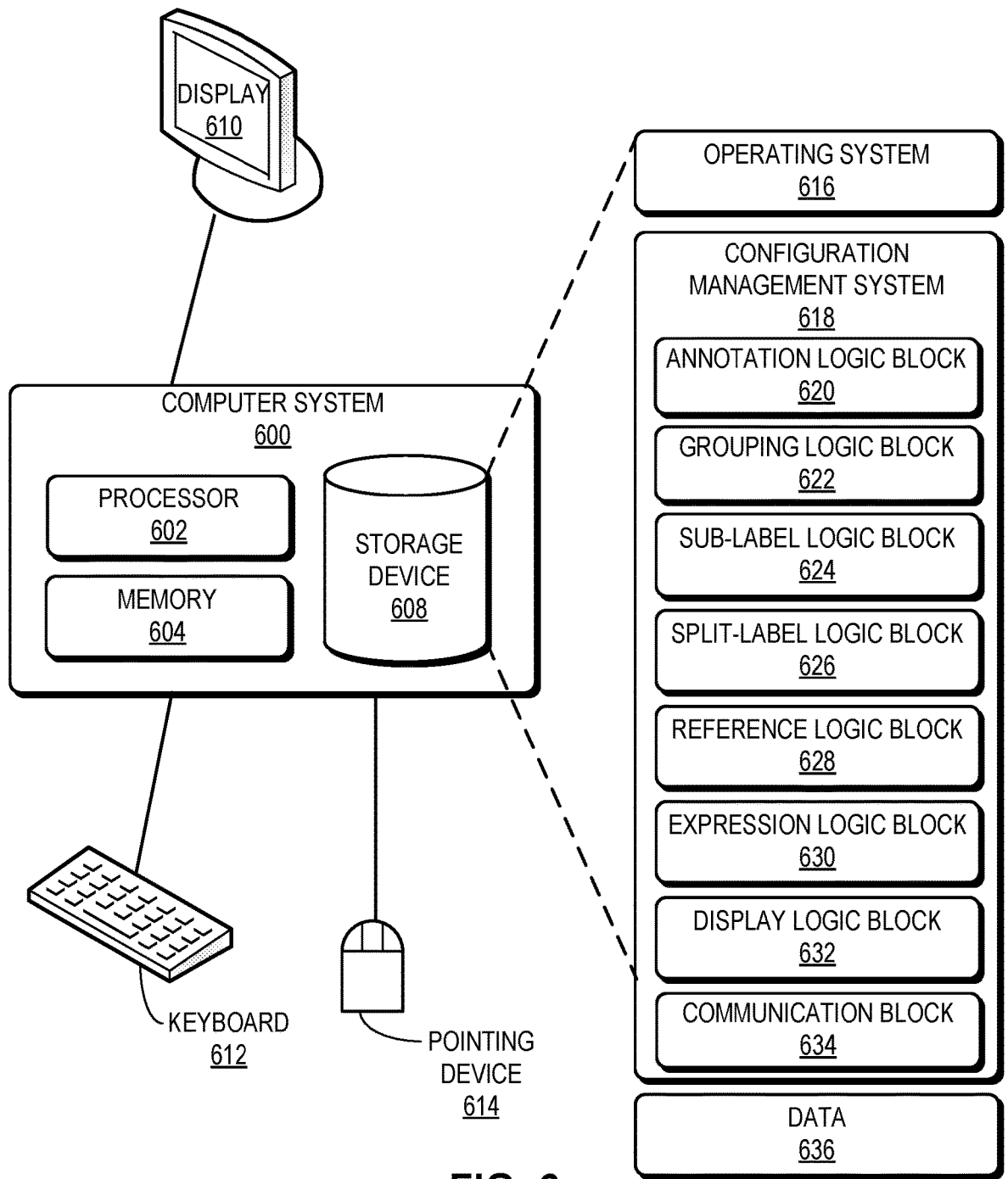
FIG. 6 illustrates an exemplary computer system that facilitates a configuration management system, in accordance with an embodiment of the present application.

FIG. 6 illustrates an exemplary computer system that facilitates a configuration management system, in accordance with an embodiment of the present application. Computer and communication system 600 includes a processor 602, a memory device 604, and a storage device 608. Memory device 604 can include a volatile memory device (e.g., a dual in-line memory module (DIMM)). Furthermore, computer and communication system 600 can be coupled to a display device 610, a keyboard 612, and a pointing device 614. Storage device 608 can store an operating system 616, a configuration management system 618, and data 636. Configuration management system 618 can facilitate the operations of system 110.

Configuration management system 618 can include instructions, which when executed by computer and communication system 600 can cause computer and communication system 600 to perform methods and/or processes described in this disclosure. Specifically, configuration management system 618 can include instructions for annotating a configuration file of a switch with labels by matching the configuration lines with the linespecs of a switch grammar (annotating logic block 620). Furthermore, configuration management system 618 can include instructions for grouping linespecs into linespec group (grouping logic block 622).

Configuration management system 618 can also include instructions for annotating the configuration file with sub-labels, if needed (sub-label logic block 624). Moreover, configuration management system 618 can include instructions for annotating the configuration file with distributed or split labels, if needed (split-label logic block 626). Furthermore, configuration management system 618 can include instructions for determining declarations and references of configuration objects (reference logic block 628). Configuration management system 618 can then include instructions for linking the references to corresponding declarations (reference logic block 628).

Configuration management system 618 can include instructions for generating regular expressions for a respective linespec (expression logic block 630). In addition, configuration management system 618 may include instructions for matching a respective configuration line with a linespec based on the corresponding regular expression (expression logic block 630). Configuration management system 618 can also include instructions for selectively displaying a selected segment of the configuration file (display logic block 632). Configuration management system 618 may further include instructions for sending and receiving messages (communication logic block 634).

Data 636 can include any data that can facilitate the operations of configuration management system 618. Data 636 can include, but are not limited to, information related to configuration files, switch grammar, ToC, labels, sub-labels, regular expressions, declarations, and references.

Figure 7:
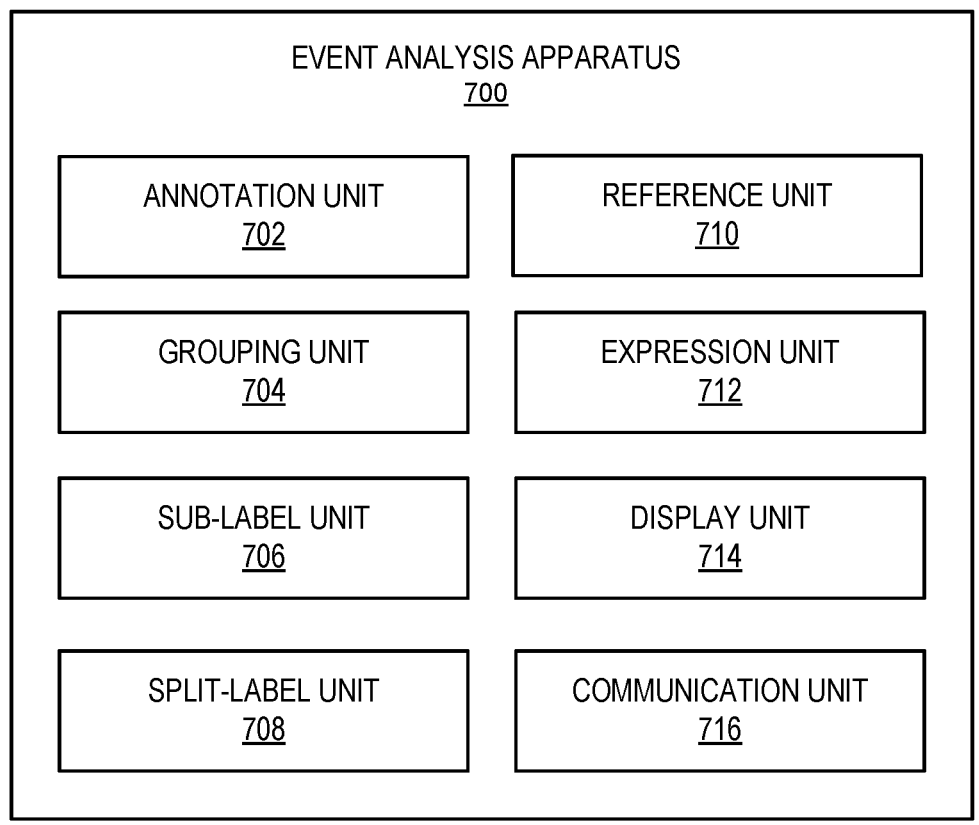
FIG. 7 illustrates an exemplary apparatus that facilitates a configuration management system, in accordance with an embodiment of the present application.

FIG. 7 illustrates an exemplary apparatus that facilitates a configuration management system, in accordance with an embodiment of the present application. Event analysis apparatus 700 can comprise a plurality of units or apparatuses which may communicate with one another via a wired, wireless, quantum light, or electrical communication channel. Apparatus 700 can be a switch in a network. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can comprise units 702-716, which perform functions or operations similar to modules 620-634 of computer and communication system 600 of FIG. 6, including: an annotation unit 702; a grouping unit 704; a sub-label unit 706; a split-label unit 708; a reference unit 710; an expression unit 712; a display unit 714; and a communication unit 716.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for dynamically managing a configuration file of a switch, the method comprising:
   determining, by a computer system, one or more groups of line specifications in a specification file, wherein a respective line specification indicates a format of a respective variant of a configuration command of the switch;
   annotating, by the computer system, a respective group in the specification file with a corresponding label;
   associating, by the computer system, a respective configuration command of the configuration file with a label of a group based on matching the configuration command with the group;
   associating, by the computer system, the configuration command with an entry of a table of content for the configuration file, wherein the entry corresponds to the group; and
   selectively displaying by the computer system, in a graphical user interface (GUI), one or more configuration commands associated with the label in the configuration file in response to an input to the entry of the table of content.

2. The method of claim 1, wherein matching the configuration command with the group further comprises matching the configuration command with a regular expression of the group.

3. The method of claim 2, further comprising:
   generating the regular expression based on a keyword and a unique identifier of a line specification of the group; and
   incorporating the regular expression in the specification file.

4. The method of claim 1, wherein matching the configuration command with the group further comprises:

matching the configuration command with a format indicated by the group; and annotating the configuration command with the label in the configuration file.

5. The method of claim 4, further comprising:

identifying a plurality of configuration commands with the group; and annotating the plurality of configuration commands with the label.

6. The method of claim 1, further comprising:

identifying a sub-command of the configuration command; and annotating the sub-command with a sub-label within a context of the label; and generating a sub-entry under the entry of the table of content.

7. The method of claim 1, further comprising grouping a plurality of non-contiguous configuration commands associated with the label in adjacent lines of the configuration file.

8. The method of claim 1, further comprising:

annotating a first configuration command declaring a configuration object with a first label;

annotating a second configuration command referencing the configuration object with a second label; and linking the second label to the first label.

9. The method of claim 1, wherein determining the one or more groups further comprises:

determining a level of a match for one or more terms in a line specification with one or more other line specifications; and in response to the level of the match being greater than a threshold, grouping the line specification with the one or more other line specifications.

10. A computer system, comprising:

a processor;

a non-transitory computer-readable storage medium storing instructions, which when executed by the processor causes the processor to perform a method for dynamically managing a configuration file of a switch, the method comprising:

determining one or more groups of line specifications in a specification file, wherein a respective line specification indicates a format of a respective variant of a configuration command of the switch;

annotating, by the computer system, a respective group in the specification file with a corresponding label;

associating, by the computer system, a respective configuration command of the configuration file with a label of a group based on matching the configuration command with the group; and associating, by the computer system, the configuration command with an entry of a table of content for the configuration file, wherein the entry corresponds to the group; and selectively displaying by the computer system, in a graphical user interface (GUI), one or more configuration commands associated with the label in the configuration file in response to an input to the entry of the table of content.

11. The computer system of claim 10, wherein matching the configuration command with the group further comprises matching the configuration command with a regular expression of the group.

12. The computer system of claim 11, wherein the method further comprises:

generating the regular expression based on a keyword and a unique identifier of a line specification of the group; and incorporating the regular expression in the specification file.

13. The computer system of claim 10, wherein matching the configuration command with the group further comprises:

matching the configuration command with a format indicated by the group; and annotating the configuration command with the label in the configuration file.

14. The computer system of claim 13, wherein the method further comprises:

identifying a plurality of configuration commands with the group; and annotating the plurality of configuration commands with the label.

15. The computer system of claim 10, wherein the method further comprises:

identifying a sub-command of the configuration command; and annotating the sub-command with a sub-label within a context of the label; and generating a sub-entry under the entry of the table of content.

16. The computer system of claim 10, wherein the method further comprises grouping a plurality of non-contiguous configuration commands associated with the label in adjacent lines of the configuration file.

17. The computer system of claim 10, wherein the method further comprises:

annotating a first configuration command declaring a configuration object with a first label;

annotating a second configuration command referencing the configuration object with a second label; and linking the second label to the first label.

18. The computer system of claim 10, wherein determining the one or more groups further comprises:

determining a level of a match for one or more terms in a line specification with one or more other line specifications; and in response to the level of the match being greater than a threshold, grouping the line specification with the one or more other line specifications.

* * * * *